(12) United States Patent
Rudy et al.

(10) Patent No.: US 9,087,537 B1
(45) Date of Patent: Jul. 21, 2015

(54) SYSTEM FOR ADJUSTING LAPPING OF A TRANSDUCER USING A DISK WINDAGE

(71) Applicant: Western Digital (Fremont), LLC, Fremont, CA (US)

(72) Inventors: Steven C. Rudy, San Jose, CA (US); Changqing Shi, San Ramon, CA (US); Yufeng Hu, Fremont, CA (US); Mark D. Moravec, Pathumthani (TH); Eric R. McKie, Pleasanton, CA (US); Nurul Amin, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/275,115

(22) Filed: May 12, 2014

Related U.S. Application Data

(62) Division of application No. 12/880,913, filed on Sep. 13, 2010, now Pat. No. 8,758,083.

(51) Int. Cl.
*G11B 5/48* (2006.01)
*G11B 5/31* (2006.01)
*G11B 5/60* (2006.01)
*G11B 21/21* (2006.01)

(52) U.S. Cl.
CPC .............. *G11B 5/4866* (2013.01); *G11B 5/314* (2013.01); *G11B 5/3169* (2013.01); *G11B 5/6005* (2013.01); *G11B 21/21* (2013.01)

(58) Field of Classification Search
CPC .... G11B 5/6005; G11B 5/3169; G11B 5/314; G11B 5/4866; G11B 21/21
USPC ............. 451/5, 8, 10, 11, 41; 360/122, 97.13, 360/234.3, 234.4, 234.5, 234.6, 235.4, 360/235.6, 235.7, 323, 324; 29/603.01, 29/603.09, 603.1, 603.15, 603.16
See application file for complete search history.

(56) References Cited

U.S. PATENT DOCUMENTS

| | | |
|---|---|---|
| 5,210,667 A | 5/1993 | Zammit |
| 5,463,805 A | 11/1995 | Mowry et al. |
| 5,559,429 A | 9/1996 | Mowry et al. |
| 5,722,155 A | 3/1998 | Stover et al. |
| 5,755,612 A | 5/1998 | Schaenzer et al. |
| 5,816,890 A | 10/1998 | Hao et al. |

(Continued)

OTHER PUBLICATIONS

Office Action dated Apr. 29, 2013 from U.S. Appl. No. 12/880,913 7 pages.

(Continued)

*Primary Examiner* — Eileen Morgan (57) ABSTRACT

A system for providing transducer(s) including a disk structure and having an air-bearing surface (ABS) are described. The disk structure resides a distance from the ABS and has a disk dimension substantially perpendicular to the ABS. Lapping control and disk windage ELGs are provided. The lapping control ELG has first and second edges first and second distances from the ABS. The disk windage ELG has edges different distances from the ABS. A difference between these edges corresponds to the disk dimension. A windage resistance of the disk windage ELG is measured and a disk windage determined. The disk windage corresponds to a difference between designed and actual disk dimensions perpendicular to the ABS. A lapping ELG target resistance is determined based on the disk windage. The transducer is lapped. Lapping is terminated based on a resistance of the lapping control ELG and the lapping ELG target resistance.

9 Claims, 7 Drawing Sheets

(56) References Cited

U.S. PATENT DOCUMENTS

| | | | |
|---|---|---|---|
| 5,876,264 A * | 3/1999 | Church et al. | 451/5 |
| 6,027,397 A | 2/2000 | Church et al. | |
| 6,034,849 A | 3/2000 | Takizawa | |
| 6,047,224 A | 4/2000 | Stover et al. | |
| 6,193,584 B1 | 2/2001 | Rudy et al. | |
| 6,330,488 B1 | 12/2001 | Yoshida et al. | |
| 6,347,983 B1 | 2/2002 | Hao et al. | |
| 6,684,171 B2 | 1/2004 | Church et al. | |
| 6,758,722 B2 | 7/2004 | Zhu | |
| 6,950,289 B2 | 9/2005 | Lam et al. | |
| 7,359,152 B2 | 4/2008 | Matono et al. | |
| 8,003,304 B2 * | 8/2011 | Nikitin et al. | 430/314 |
| 8,151,441 B1 * | 4/2012 | Rudy et al. | 29/603.09 |
| 8,291,743 B1 * | 10/2012 | Shi et al. | 73/1.01 |
| 8,443,510 B1 * | 5/2013 | Shi et al. | 29/603.16 |
| 8,717,709 B1 * | 5/2014 | Shi et al. | 360/125.13 |
| 8,758,083 B1 * | 6/2014 | Rudy et al. | 451/5 |
| 2008/0072418 A1 | 3/2008 | Kondo et al. | |
| 2009/0197208 A1 * | 8/2009 | Nikitin et al. | 430/313 |

OTHER PUBLICATIONS

Office Action dated Nov. 6, 2013 from U.S. Appl. No. 12/880,913 6 pages.

Notice of Allowance dated Nov. 6, 2013 from U.S. Appl. No. 12/880,913 7 pages.

\* cited by examiner

SYSTEM FOR ADJUSTING LAPPING OF A TRANSDUCER USING A DISK WINDAGE

This application is a divisional of co-pending application Ser. No. 12/880,913 filed on Sep. 13, 2010, which is hereby incorporated by reference.

BACKGROUND

Figure 1:
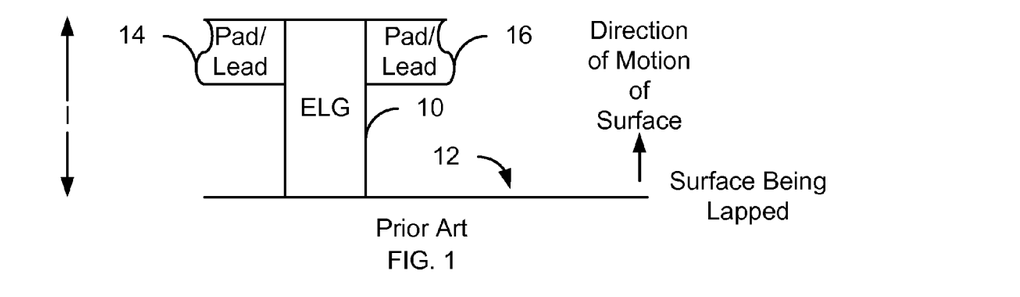
FIG. 1 depicts a conventional ELG as used in a conventional magnetic transducer.

Conventional magnetic heads typically employ lapping to fabricate structures within the head. In order to control lapping an electronic lapping guide (ELG) is typically used. FIG. 1 depicts a top view of a conventional ELG 10. The conventional ELG 10 is essentially a resistive stripe. Thus, the conventional ELG 10 is coupled with pads/leads 14 and 16 that are used to provide electrical connection to the conventional ELG 10. Using the pads/leads 14 and 16 the resistance of the conventional ELG 10 may be determined. The conventional ELG has a length l from the surface 12 being lapped. As lapping continues, the surface 12 is worn away, and the length of the conventional ELG 10 decreases. As the length is reduced, the resistance of the conventional ELG 10 increases. Using the resistance of the conventional ELG 10, it can be determined when lapping should be terminated.

Figure 2:
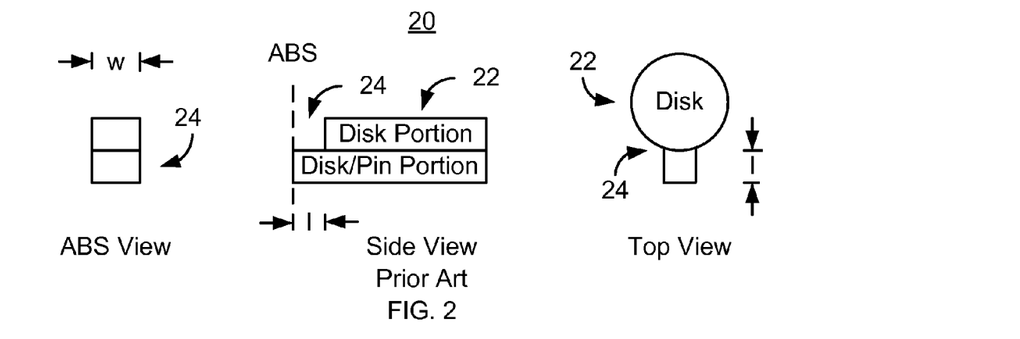
FIG. 2 depicts a conventional NFT in a conventional EAMR transducer.

For example, energy assisted magnetic recording (EAMR) transducer is typically lapped during fabrication. A conventional EAMR transducer includes not only magnetic components, such as poles, coils, and shields, but also energy-delivery components. An EAMR transducer may include optical components gratings, waveguides and near-field transducers (NFTs). FIG. 2 depicts a portion of a conventional NFT 20. A conventional NFT 20 typically includes a disk portion 22 and a pin portion 24. The disk portion 22 is wider in the direction parallel to the air-bearing surface (ABS) than the pin portion 24. Lapping may be used to control the length, l, of the pin portion 24 of the NFT, as well as other lengths such as the throat length of the pole (not shown in FIG. 2).

Figure 3:
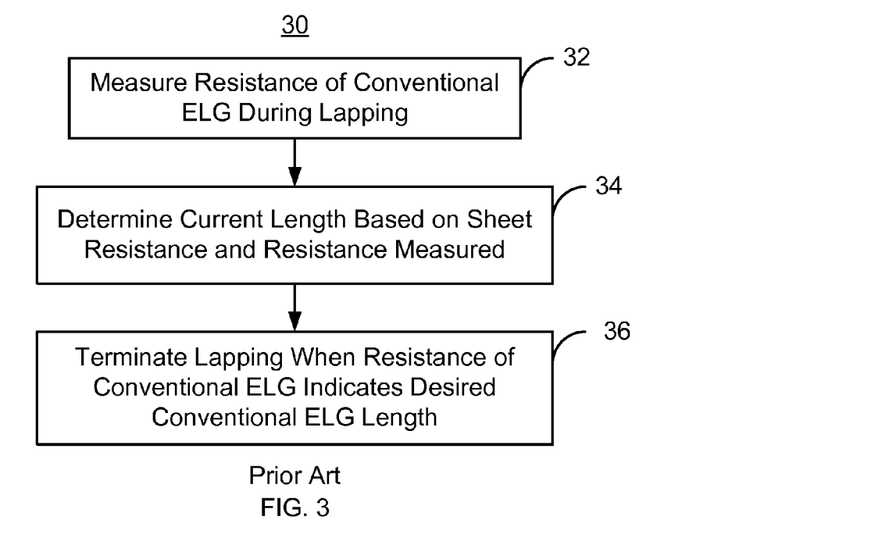
FIG. 3 is a flow chart depicting a conventional method for performing lapping utilizing a conventional ELG.

FIG. 3 is a flow chart depicting a conventional method 30 for performing lapping using the conventional ELG 10. The lapping performed in the method 30 may be used in fabricating the conventional NFT 20. The resistance of the conventional ELG 10 is measured during lapping of the transducer, via step 32. The current length of the conventional ELG 10 is determined based upon the resistance measured in step 32 and the sheet resistance of the conventional ELG 10, via step 34. Thus, after step 34, the length corresponding to a particular measured resistance for the conventional ELG 10 is known. Alternatively, step 34 could simply convert a desired length of the pin portion 24 to an ELG length and the ELG length to a desired target resistance of the conventional ELG 10.

The lapping is terminated when the resistance of the conventional ELG 10 indicates that the desired length or target resistance of the conventional ELG 10 has been reached, via step 36. Because the conventional ELG 10 and structure, such as a read sensor or pole, both exist on the transducer being lapped, the lengths of the conventional ELG 10 and the structure change with lapping. Consequently, the lengths of the read sensor or pole may also be set in step 36.

Although the conventional method 30 and conventional ELG 10 function, the desired length of the NFT may not be easily controlled to the desired length. The dimensions of the conventional NFT 20 are desired to be carefully controlled. For example, the distance between the disk portion 22 of the NFT 20 and the ABS (i.e. the length of the pin portion 24) is desired to be closely controlled. Such control may be difficult to achieve using conventional manufacturing and lapping methods. Thus, fabrication of the conventional EAMR transducer may be challenging.

Accordingly, what is needed is an improved method for providing and using an ELG in a magnetic transducer such as an EAMR transducer.

SUMMARY

A system for providing transducer(s) including a disk structure and having an air-bearing surface (ABS) are described. The disk structure resides a distance from the ABS and has a disk dimension substantially perpendicular to the ABS. The system include providing lapping control and disk windage ELGs. The lapping control ELG has a first edge a first distance from the ABS and a second edge a second distance from the ABS. The disk windage ELG has a third edge a third distance from the ABS and a fourth edge a fourth distance from the ABS. A difference between the third edge and the fourth edge corresponds to the disk dimension. The system also include measuring a windage resistance of the disk windage ELG and determining a disk windage corresponding to a difference between a designed disk dimension perpendicular to the ABS and the disk dimension. The system also include determining a lapping ELG target resistance based on the disk windage. The system also include lapping the transducer and terminating the lapping based on a resistance of the lapping control ELG and the lapping ELG target resistance.

DETAILED DESCRIPTION OF THE PREFERRED EMBODIMENTS

Figure 4:
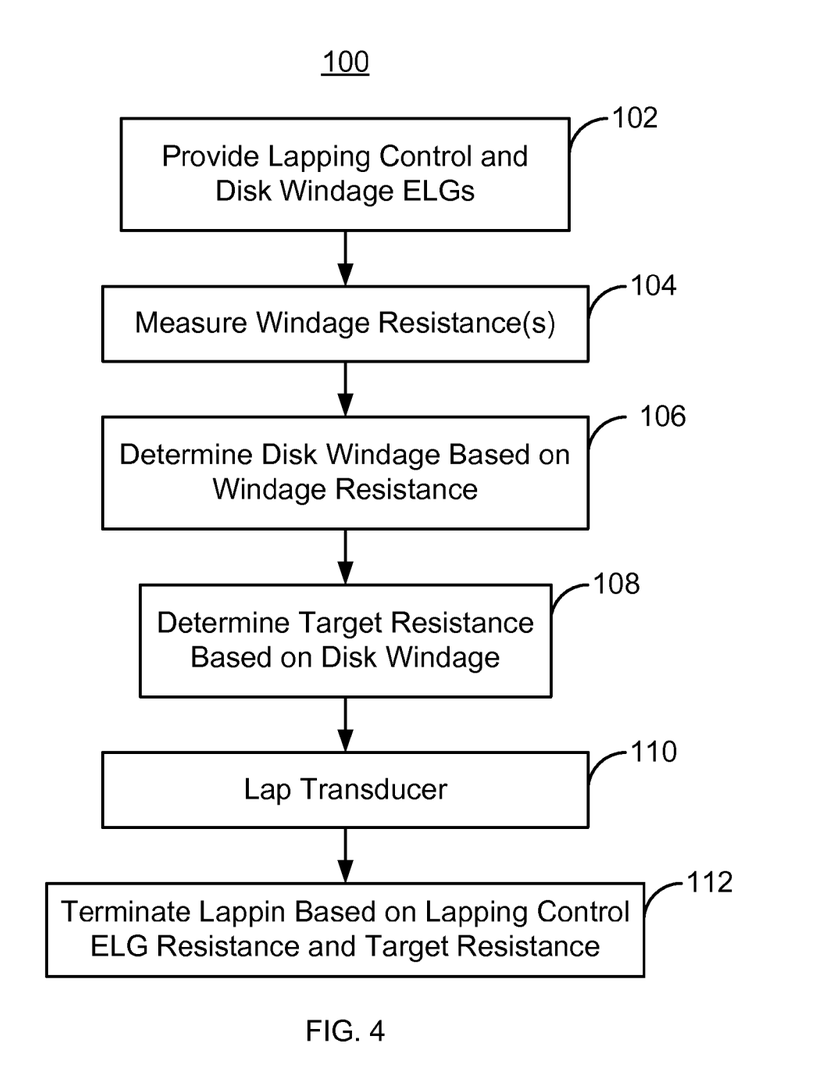
FIG. 4 is a flow chart depicting an exemplary embodiment of a method for lapping a transducer including a disk structure.
Figure 5:
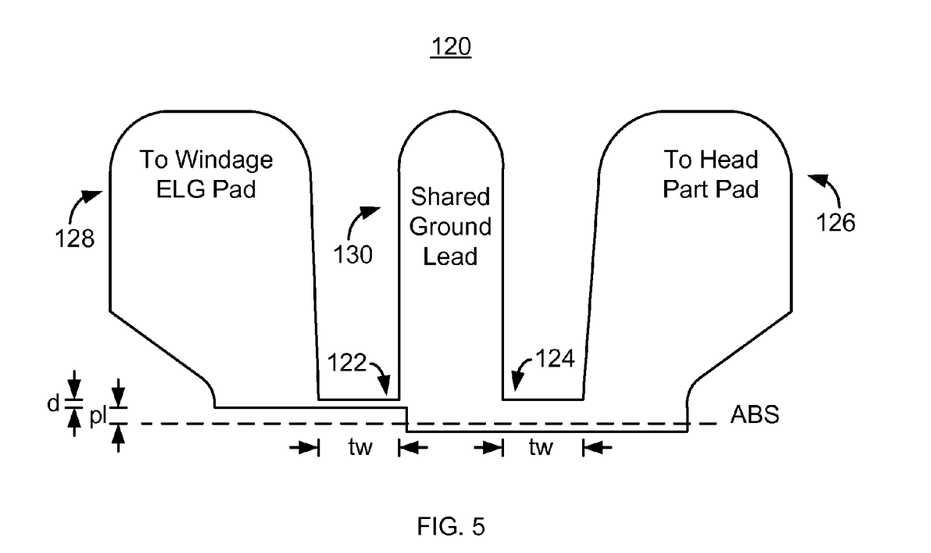
FIG. 5 depicts an exemplary embodiment of a lapping control resistor and a windage ELG.
Figure 6:
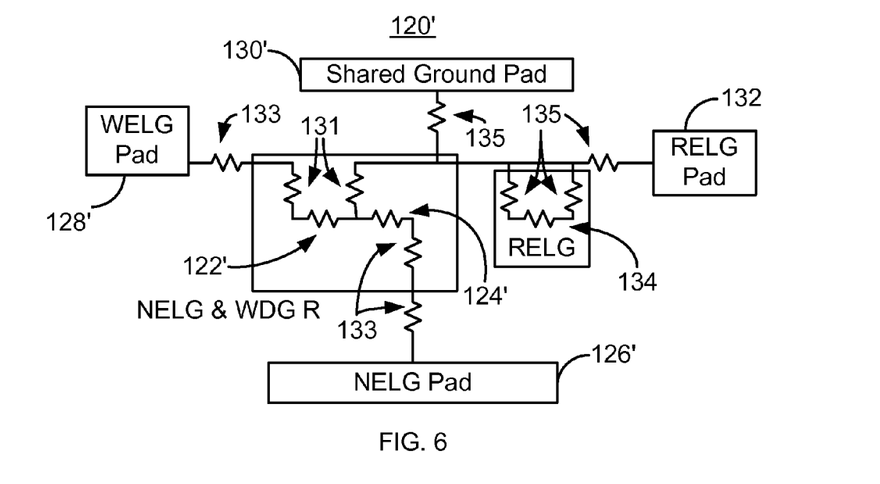
FIG. 6 depicts an electronic diagram of another embodiment of a transducer including a magnetic structure to be lapped using a lapping control resistor and a windage ELG.

FIG. 4 is a flow chart depicting an exemplary embodiment of a method 100 for lapping a transducer including a disk structure. For simplicity, some steps of the method 100 may be omitted. FIGS. 5-6 depict exemplary embodiments of a portion of transducers 120 and 120' with which the method 100 may be used. For clarity FIG. 5 is not to scale. FIG. 6 is a circuit diagram corresponding to the transducer 120 depicted in FIG. 5. Only certain portions of the transducer 120/120' are shown in FIGS. 5-6. The transducer 120/120' each includes at least one structure (not shown in FIGS. 5-6) on which lapping is to be performed. Although multiple structures may be lapped, the method 100 and transducer 120/120' relate to a structure for which the distance from the ABS is desired to be set by lapping. In the embodiment described, this structure is a disk structure. For example, the method 100 may be used when lapping the pin portion of the NFT, which determines the distance between the disk portion of the NFT and the ABS. The disk portion of the NFT is the disk structure in such an embodiment. Although termed a "disk" portion, the portion may have a shape other than a circle. The method 100 may also be used in fabricating other structures, particularly those such as disks or squares, which are symmetric. The method 100 is also described in the context of single transducers 120. However, the method 100 may be used for fabricating multiple transducers and/or multiple structures and may employ multiple ELG(s) at substantially the same time. The method 100 is also described in the context of one ELG being used for each structure being fabricated. However, the method 100 may use one ELG for multiple structures or vice versa.

Lapping control and disk windage ELGs are provided, via step 102. The lapping control ELG is desired to have a resistance which changes during lapping. Thus, the lapping control ELG has a first edge a first distance from the ABS and a second edge a second distance from the ABS. As used herein the ABS may be the desired location of the ABS to which the transducer 120 is lapped. Thus, the resistance of the lapping control resistor may change during lapping of the transducer. For example, the lapping control resistor may be used to set the throat length of the pole. The disk windage ELG has a third edge a third distance from the ABS and a fourth edge a fourth distance from the ABS. The difference between the third and fourth edges corresponds to a disk dimension. In some embodiments, the disk dimension is the diameter of the disk as measured perpendicular to the ABS. Thus, the distance between the third and fourth edges of the disk windage ELG would equal the disk diameter. In other embodiments, the difference between the third and fourth edges may be another dimension of the disk. The disk windage ELG is used to determine the disk windage. As used herein, the disk windage is the difference between the actual disk dimension as measured using the windage resistor and the calculated disk dimension used in designing the masks used in fabrication of the transducer 120. For example, the disk windage may be the difference between the actual diameter of the disk portion of the NFT and the calculated diameter of the disk portion of the NFT used in designing the transducer 120.

FIG. 5 depicts the conventional transducer after formation of the lapping ELG and disk windage ELG. The transducer 120 includes a disk windage ELG 122 having leads 128 and 130 and a lapping ELG having leads 126 and 130. Thus, the ELGs 122 and 124 share a ground lead 130. In other embodiments, the ELGs 122 and 124 need not share a ground lead. However, the resistances of the ground leads would be known. In the embodiment shown, the lapping ELG 124 and disk windage ELG have the same track width tw. In other embodiments, the track widths may differ. However, in such embodiments, the differences in track widths are generally desired to be known. In addition to sharing a ground lead 130, the remaining leads 126 and 128 are also matched. Stated differently, the leads 126 and 128 have the same resistance. In other embodiments, the leads 126 and 128 have known resistances. Further, the materials used for the disk windage ELG 122 and the lapping control ELG may be the same. As a result, the differences in resistance between the lapping ELG 124 and the disk windage ELG 122 may be due to the differences in height. More specifically, the height of the disk windage ELG may be determined based on the resistance of the disk windage ELG 124. The disk windage ELG 124 is a distance p1 from the ABS and has a stripe height, d, perpendicular to the ABS.

FIG. 6 depicts a circuit diagram of the transducer 120'. Thus, in addition to the disk windage ELG 122', lapping control ELG 124' and pads 126', 128', and 130', resistors 131, 133, and 135 are shown. Resistors 131, 133, and 135 represent lead and other resistances in the circuit. Also shown are a reader ELG 134 and pad 132. These components 132 and 134 may be used in lapping a read transducer in a merged head. However, in other embodiments, such components 132 and 134 may not be included.

At least one windage resistance of the disk windage ELG 122 is measured, via step 104. Thus, the resistance of the disk windage ELG may be determined. Step 104 may be performed by a desired mechanism for measuring resistance.

A disk windage is determined, via step 106. As described above, the disk windage is the difference between a designed disk dimension perpendicular to the ABS and the disk dimension. The actual disk dimension is determined based upon the resistance measured in step 104. First, the resistance measured in step 104 is used to determine the stripe height, d, of the disk windage ELG 122. If the lapping ELG 124 and disk windage ELG 122 are formed of known, matching (or the same) material, the stripe height, d, of the disk windage ELG 122 may be determined based on the resistance of the disk windage ELG 122. For example, the stripe height, d, may be given by $R_s T_w/(R-R_I)$, where $R_s T_w$ is the slope of the resistance versus the inverse of the stripe height as predicted from the ELG measurement; $R_I$ is the intercept of the resistance versus the inverse of the stripe height predicted from the ELG measurement; and R is the measured resistance of the disk windage ELG 122. Wafer final probe or other data may be used to determine the sheet resistance-track width product $R_s T_w$. R is measured in step 104. Thus, the resistance measured in step 104 may be used in determining the actual stripe height of the disk windage ELG 122.

The stripe height of the disk windage resistor 122 may be converted to the disk windage. Because the manner in which it is fabricated in step 102, the disk windage ELG 122 has a stripe height that corresponds to the disk dimension. In some embodiments, the stripe height is designed to be the same as the disk dimension. For example, the disk windage ELG 122 may be designed such that the stripe height is equal to the diameter of the disk structure. The actual disk diameter in such embodiments is d. Thus, the actual diameter of the disk may be determined from the resistance of the windage ELG 122. The designed dimension (e.g. diameter) of the disk is known. The disk windage may be determined by comparing the designed stripe height (i.e. the designed disk diameter) with the actual stripe height of the disk windage ELG 122.

A lapping ELG target resistance is determined based on the disk windage, via step 108. Step 108 may include updating a lapping ELG target resistance that had previously been determined based on the designed dimensions of the disk. More specifically, the disk windage may be used to adjust a calculated target resistance for the lapping ELG 124 to account for differences between the calculated disk diameter and the actual disk diameter.

The transducer 120 is lapped, via step 110. In general, lapping is carried out substantially perpendicular to the ABS. For example, lapping may be at an angle of approximately 89.5-90.5 degrees. Lapping is then terminated based on a resistance of the lapping control ELG 124 and the lapping ELG target resistance, via step 112. More specifically, the lapping is terminated when the resistance of the lapping control ELG 124 matches the lapping ELG target resistance.

Using the method 100, the lapping target resistance may be adjusted using the disk windage. These adjustments allow for variations in the disk of the NFT as actually fabricated to be accounted for. Use of the wafer final probe data in calculating the actual stripe height, d, from the windage resistance allows the adjustments to be fed forward. Thus, the corrections may be made easily. Further, in the configuration depicted in FIGS. 5-6, no additional connections need be made during lapping.

Figure 7:
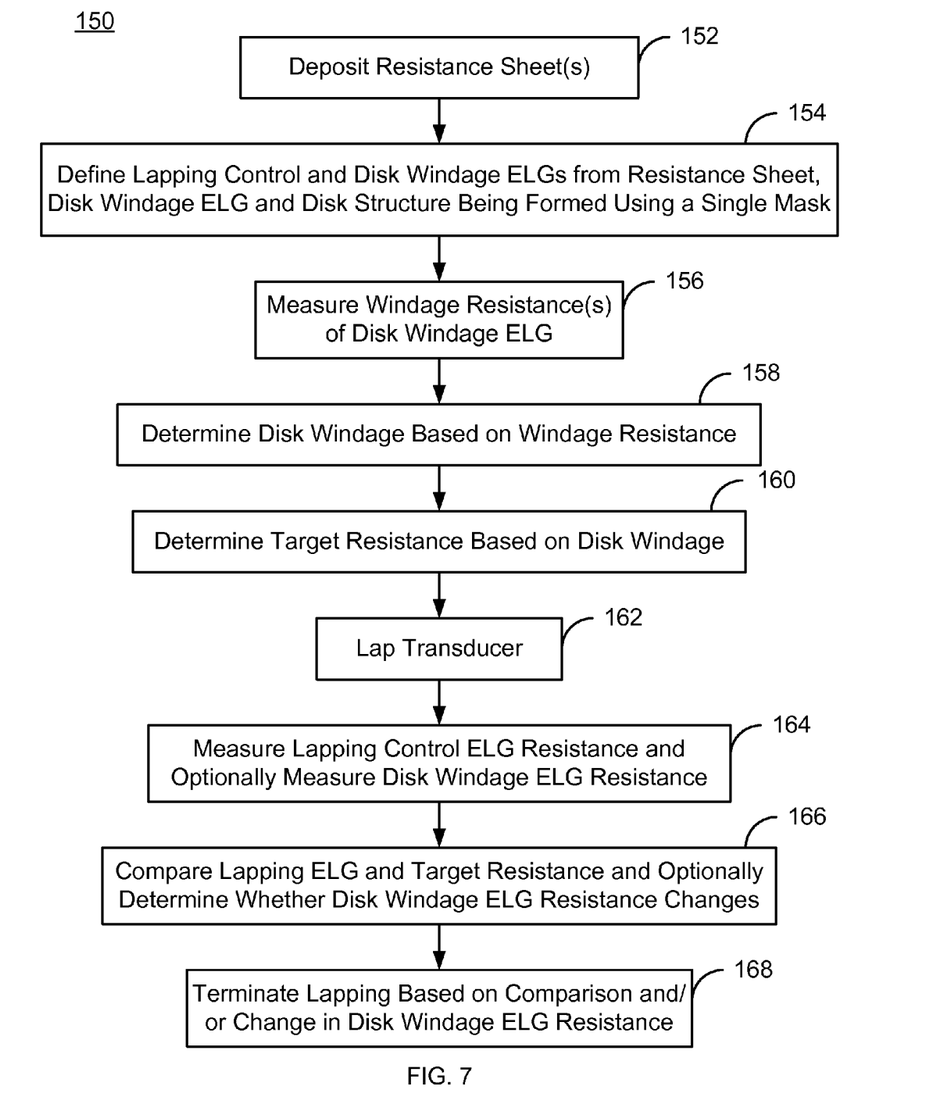
FIG. 7 is a flow chart depicting an exemplary embodiment of a method for lapping a transducer including a disk structure.
Figure 8:
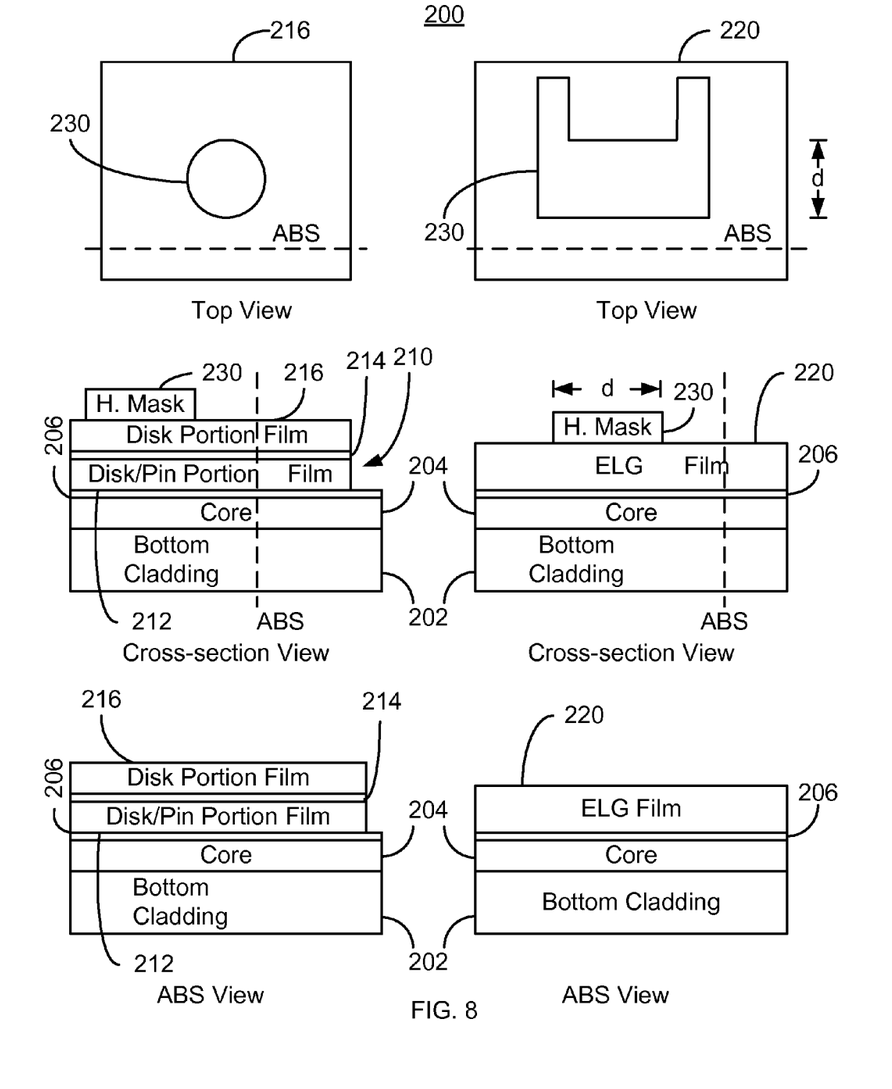
FIGS. 8-10 depict another exemplary embodiment of a transducer including a magnetic structure to be lapped using a lapping control resistor and a windage ELG during fabrication.
Figure 9:
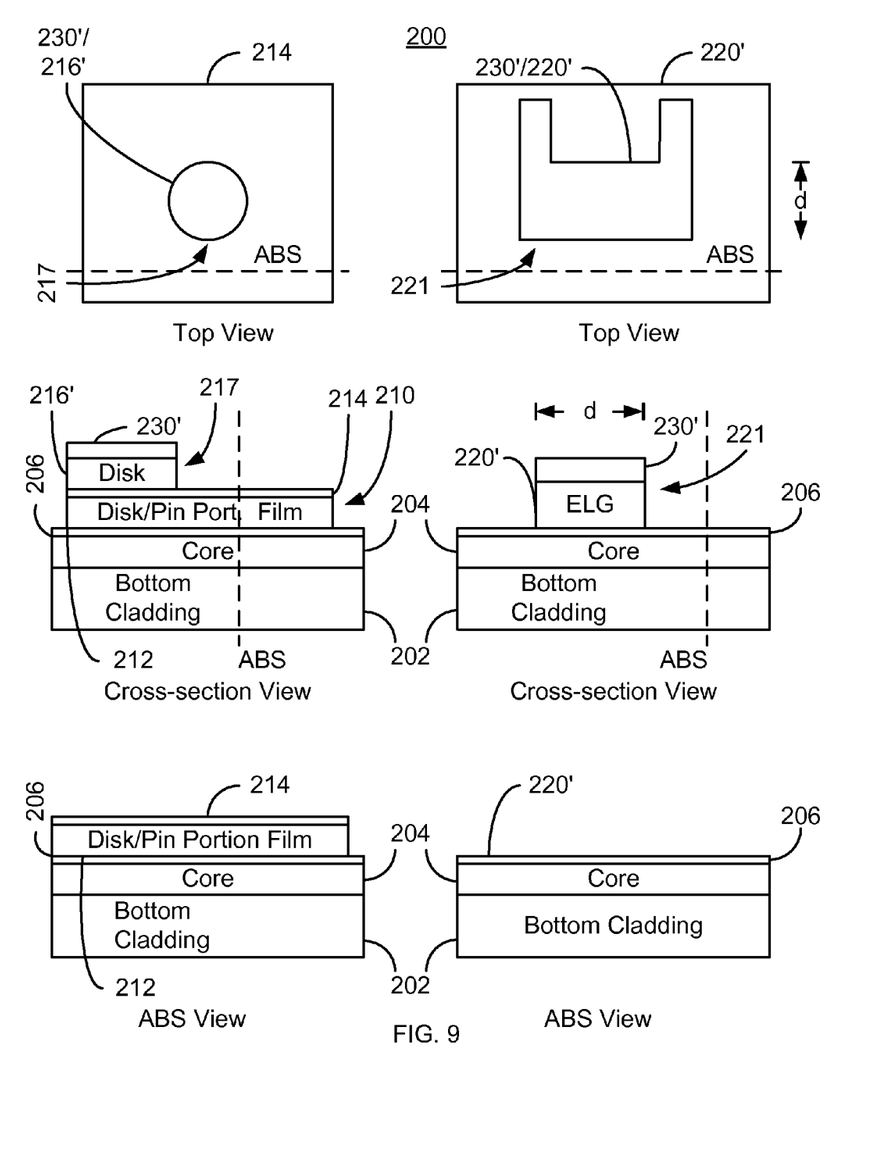
Figure 10:
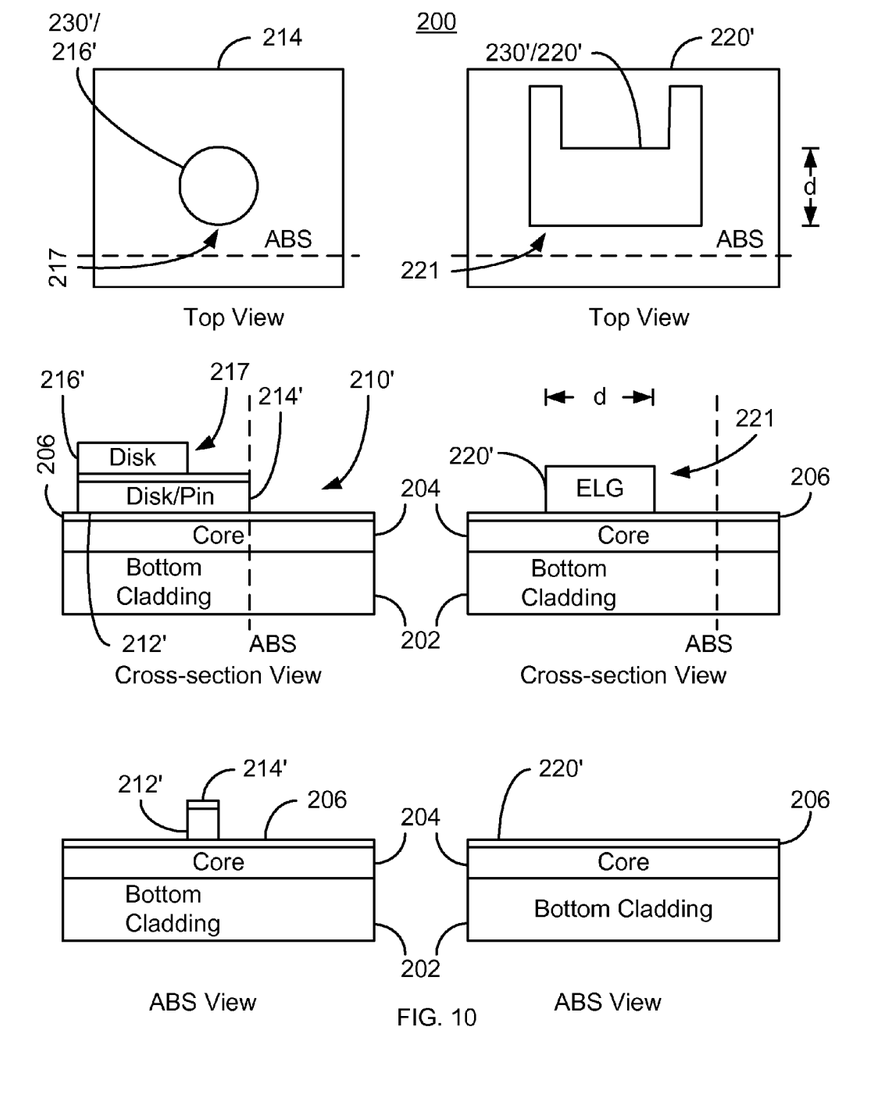

FIG. 7 is a flow chart depicting an exemplary embodiment of a method 150 for fabricating a transducer including a disk structure. For simplicity, some steps of the method 100 may be omitted. FIGS. 8-10 depict exemplary embodiments of a portion of a transducer 200 with which the method 150 may be used. The transducer is fabricated on a slider (not shown in FIGS. 8-10). For clarity FIGS. 8-10 are not to scale. Only certain portions of the transducer 200 are shown in FIGS. 8-10. More specifically, only regions corresponding to the NFT and disk windage ELG are depicted. The transducers 200 each includes at least one structure for which lapping is to be performed. Although multiple structures may be lapped, the method 150 and transducer 200 relate to a structure for which the distance from the ABS is desired to be set by lapping. In the embodiment described, this structure is a disk structure. For example, the method 150 may be used when lapping the pin portion of the NFT, which determines the distance between the disk portion of the NFT and the ABS. The disk portion of the NFT is the disk structure in such an embodiment. However, the method 150 may be used in fabricating other structures, particularly those such as disks or squares, which are symmetric. The method 150 is also described in the context of single transducers 200. However, the method 150 may be used for fabricating multiple transducers and/or multiple structures and may employ multiple ELG(s) at substantially the same time. The method 150 is also described in the context of one ELG being used for each structure being fabricated. However, the method 100 may use one ELG for multiple structures or vice versa.

Resistance sheet(s) are deposited, via step 152. Step 152 may include depositing a conductive sheet, such as a sheet of Cr. The lapping control and disk windage ELGs are defined from the resistance sheet, via step 154. The disk windage ELG and the disk structure are formed using a single mask.

For example, FIG. 8 depicts top (or plan) cross-section (or side) and ABS views of the transducer 200 during step 154. The transducer 200 may include cladding 202 and a core 204 from which a waveguide is formed. In the embodiment shown, a thin layer 206 of material has been deposited on the core 204. However, in other embodiments, this layer may be omitted. The NFT film stack 210 is used in forming the NFT. The NFT film stack 210 includes disk/pin portion film 212 and disk portion film 216, separated by another, stop layer 214. However, in other embodiments, a single layer and/or another number and type of layers may be used for the NFT. Also shown is ELG film 220. In some embodiments, both the disk windage ELG and the lapping control ELG (not shown in FIGS. 8-10) are formed from the ELG film 220. However, in other embodiments, the disk windage and lapping control ELGs may be formed from different layers. In addition, the ELG film 220 is shown as residing at substantially the same level as the NFT film stack 210. Thus, both the NFT film stack 210 and the ELG film 220 are shown as residing on the layer 206. However, in another embodiment, the NFT film stack 210 and the ELG film 220 may reside at different levels in the transducer 200. Also shown in FIG. 8 is mask 230. The mask 230 is used in defining the disk structure of the NFT. Consequently, a portion of the mask 230 is shown as being circular in the plan view. However, in other embodiments, this portion of the mask 230 may take on a different shape. A portion of the mask 230 also resides on the ELG film 230. The mask is shown as having a stripe height, d, which corresponds to the diameter of the disk 230. In addition, the distance between the ABS and the edge of the mask closest to the ABS is the same for both portions of the mask 230. The mask 230 is also shown as residing directly on the disk portion film 216 and the ELG film 220. However, in other embodiments, one or more other layers (not shown) may reside between the disk portion film 216 and the mask 230 and/or between the ELG film 220 and the mask 230.

FIG. 9 depicts the transducer 200 after step 154 has been performed. Thus, the disk portion 216' has been formed. In addition, the disk windage ELG 220' is defined. The disk portion 216' and disk windage ELG 220' are both defined using the mask 230'. in the embodiment shown, the front edge 217 of the disk portion 216' is the same distance from the ABS as the front edge 221 of the disk windage ELG 220'. Further, the stripe height of the disk windage ELG 220' is substantially the same as the diameter of the disk portion 216'. However, in other embodiments, the front edge 221 of the disk windage ELG 220' may be offset from the front edge 217 of the disk portion 216'. For example, in some embodiments, the front edge 221 of the disk windage ELG 220' may be closer to the ABS than the front edge 217 of the disk portion 216'. Any such offset is generally desired to be designed to be known and relatively small.

At least one windage resistance of the disk windage ELG 220' is measured, via step 156. Thus, the resistance of the disk windage ELG may be determined. Step 156 is analogous to step 104 of the method 100.

The disk windage is determined, via step 158. As described above, the disk windage is determined based upon the resistance measured in step 156. Step 158 is analogous to step 106 of the method 100.

The lapping ELG target resistance is determined based on the disk windage, via step 160. Step 160 is analogous to step 108 of the method 100.

The transducer 200 is lapped, via step 162. During lapping, the resistance of the lapping control ELG is measured, via step 164. Also in step 164, the resistance of the disk windage ELG 220' may optionally be measured during lapping. The disk windage ELG resistance may be measured in step 164 if the front 221 of the disk windage ELG 220' is closer to the ABS than the front 217 of the disk. However, in other embodiments, the resistance of the disk windage ELG 220' may be measured when the fronts 217 and 221 are the same distance from the ABS. The resistance of the lapping control ELG determined in step 164 is compared against the target resistance, via step 166. Also in step 166, it may be determined whether the resistance of the disk windage ELG 220' has changed. This may be accomplished by comparing the last measured resistance of the disk windage ELG 220' with a previously-measured resistance. Steps 164 and 166 may be carried out multiple times during lapping in step 162.

Lapping is then terminated based on the resistance of the lapping control ELG and the lapping ELG target resistance and/or based on a change in the disk windage ELG resistance, via step 168. More specifically, the lapping may be terminated when the resistance of the lapping control ELG matches the lapping ELG target resistance. In other embodiments, the lapping may be terminated when the resistance of the disk windage ELG 220' changes. Terminating lapping when the disk windage ELG 220' changes resistance may prevent the pin portion 214 of the NFT from being inadvertently lapped too closer to the disk 220' and may preclude removal of a portion of the disk portion 216' of the NFT. In other embodiments, the lapping may be terminated when the first of the target resistance is reached and a change in the disk windage ELG resistance occurs.

Using the method 150, the lapping target resistance may be adjusted using the disk windage. These adjustments allow for variations in the disk of the NFT as actually fabricated to be accounted for. Use of the wafer final probe data in calculating the actual stripe height, d, from the windage resistance allows the adjustments to be fed forward. Thus, the corrections may be made easily. Further, in the configuration depicted in FIGS. 5-6, no additional connections need be made during lapping. In addition, overlapping of the disk portion 216' of the NFT and/or the pin portion 214 may be prevented.

We claim:

1. A slider comprising:
   at least one transducer including a disk structure and having an air-bearing surface (ABS), the disk structure residing a distance from the ABS and having a disk dimension substantially perpendicular to the ABS;
   a lapping control electronic lapping guide (ELG) having a first edge a first distance from the ABS and a second edge a second distance from the ABS; and
   a disk windage ELG having a third edge a third distance from the ABS and a fourth edge a fourth distance from the ABS, a difference between the third edge and the fourth edge corresponding to the disk dimension.

2. The slider of claim 1 wherein the disk structure is a disk of a near-field transducer.

3. The slider of claim 1 wherein the lapping control ELG has a first track width and the disk windage ELG has a second track width substantially equal to the first track width.

4. The slider of claim 1 wherein the lapping control ELG is coupled with a first plurality of leads having a first leads resistance and the disk windage ELG is coupled with a second plurality of leads having a second leads resistance, the first leads resistance being substantially equal to the second leads resistance.

5. The slider of claim 4 wherein the first plurality of leads and the second plurality of leads include a common ground lead.

6. The slider of claim 1 wherein the lapping control ELG and the disk windage ELG are formed from a single resistive sheet.

7. The slider of claim 1 wherein the fourth distance is substantially equal to the second distance.

8. The slider of claim 1 wherein the third distance of the disk windage ELG from the ABS is equal the distance the disk structure is recessed from the ABS.

9. The slider of claim 1 wherein the difference between the third edge and the fourth edge is equal to the disk dimension.

* * * * *